Jan. 5, 1954 V. J. DI CHIARA ET AL 2,664,606
RING MOLD
Filed Dec. 18, 1951
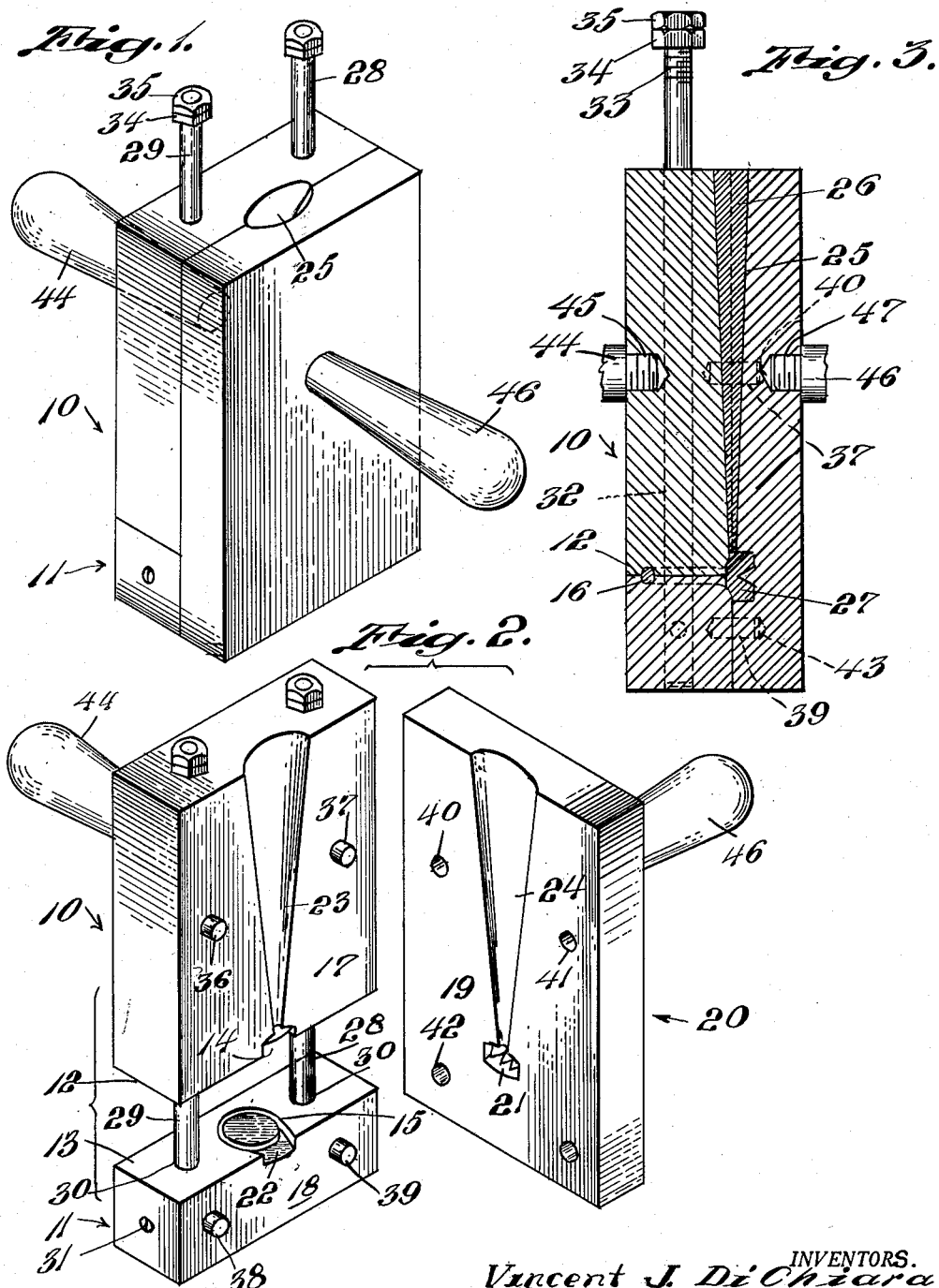
INVENTORS.
Vincent J. Di Chiara
Marcel Bruscini
BY
Barlow & Barlow
ATTORNEYS.

Patented Jan. 5, 1954

2,664,606

UNITED STATES PATENT OFFICE 2,664,606

RING MOLD

Vincent J. Di Chiara, Johnston, and Marcel Bruscini, Providence, R. I., assignors to Marvin Co., a partnership Application December 18, 1951, Serial No. 262,266

4 Claims. (Cl. 22—114)

This invention relates to a ring mold of the type used by jewelers in the forming of a finger ring.

Heretofore rings have been made by casting or molding, and in many instances the molds are destroyed after each ring is formed in order that the ring may be taken from the mold. In some cases the molds have been made of metal and provided with cores and other more intricate structures and were of such form that the molding process was very slow.

One of the objects of this invention is to provide a mold of a simple construction which may be easily and quickly used.

Another object of this invention is to provide a mold of metal blocks which will be separable and usable repeatedly for as many castings as it is desired to make.

Another object of the invention is to provide a mold which is so arranged that it may be held by one hand and operated by one person without the use of wrenches or tools.

Another object of the invention is to provide a mold, the sections of which may be easily separated by hand.

With these and other objects in view, the invention consists of certain novel features of construction as will be more fully described and particularly pointed out in the appended claims.

In the accompanying drawings:

Figure 1 is a perspective view of the mold constructed in accordance with this invention;

Figure 2 is a perspective view of the different sections of the mold in exploded relation, showing the cavities or grooves therein;

Figure 3 is a sectional view substantially centrally through the mold sections, illustrating the ring in position in the mold.

In proceeding with this invention, we have provided two sections having faces which contact with each other and which faces are grooved in shape to co-operate and form the mold for the shank of the ring, while we have provided a third section which has a groove registering with the grooves of the other two sections and which will form the head of the ring. Means are provided for registering the sections and also handles for holding the sections while the first two sections are slidably related and limited in their sliding movement for quick operation.

With reference to the drawings two block sections 10 and 11 are provided, which have faces 12 and 13 which contact with each other. In the face 12 there is provided a groove 14, while in the face 13 there is provided a groove 15, the arrangement being such that when the faces contact, the grooves 14 and 15 co-operate to provide a mold for the shank 16 of the ring. There is also provided another face 17 on the block 10 and 18 on the block 11, which faces are in a single plane for contact with the face 19 of the third block section 20. This block section 20 has a groove 21 which registers with the grooves 14 and 15 along the portion 22 of these grooves so as to provide a mold for the top 27 of the ring. Additionally there is a groove 23 in the block section 10 and a groove 24 in the third block section 20, which when these blocks are in assembled registering relation provide an opening 25 for the gate 26 of the ring.

The block sections 10 and 11 are slidably related by rods 28 and 29 which are fixed in the section 11 by means of bores 30 into the section for the insertion of the rods 28 and 29, these rods being secured in this section by set screws 31, while there are bores 32 extending lengthwise through the section 10 through which the rods 28 and 29 slidably pass so that the two sections 10 and 11 may be guided in a sliding movement toward and from each other. The rods are each threaded as at 33 at their upper ends and provided with nuts 34 and lock nuts 35 so that the sliding movement of the rods 28 and 29 through the section 10 may be limited in movement.

In order that the sections 10 and 11 when slid together may be aligned with the third section 20, we have provided dowels or detents 36 and 37 on the face 17 of the block 10 and 38 and 39 on the face 18 of the block 11 which will enter the recesses 40, 41, 42, and 43 in the face 19 of the third block section 20 so as to hold the sections in aligned relation and the first two sections 10 and 11 in closed assembled relation.

There is a handle 44 on section 10 which has threaded engagement as at 45 in a recess therein, while a handle 46 has threaded engagement as at 47 on the third block section 20.

In using this mold, an operator will place the same in assembled relation as shown in Figure 1 or Figure 3 and by holding a handle 44 in one hand and pressing handle 46 against a bench, he may pour into the opening 25 the material to cast the ring. When the material becomes set, which is very quickly, it is merely necessary to grasp the two handles and lift away the third section 20 from the other two sections, leaving the ring in the two sections 10, 11 and then by tapping on the nuts or upper ends of the rods 28 and 29, the section 11 will be slid down away from the section 10, leaving the ring and its gate complete in section 16. The gate may then be grasped by one hand and the ring lifted from the recess 14 and the gate broken from the ring, when the operation may be repeated for a further casting.

We claim:

1. A ring mold comprising two metal block sections having faces contacting with each other in generally a horizontal plane, each with grooves in said contacting faces of a shape to co-operate and form a mold for the shank of a ring, each of said blocks having second contacting faces at generally right angles to the first said faces, and a third metal block section having a face contacting with said second faces of the first two said block sections in generally a vertical plane and provided with a groove registering with said grooves to form a mold for the top of the ring, said third block section and one of said two block sections being recessed to co-operate and provide a vertical gate directly to the junction of said grooves cooperating to form the shank and head of the ring.

2. A ring mold as in claim 1 wherein a pair of rods are fixed to one of said two block sections and extend through the other of said two block sections to slidably guide said sections toward and from the grooved faces which contact with each other.

3. A ring mold as in claim 1 wherein said rods carry means to limit the movement of said sections apart.

4. A ring mold as in claim 1 wherein recess and detent means on said third section and said two sections align said third section with said two sections.

VINCENT J. DI CHIARA.
MARCEL BRUSCINI.

References Cited in the file of this patent
UNITED STATES PATENTS

| Number | Name | Date |
|---|---|---|
| 662,562 | Ford | Nov. 27, 1900 |
| 695,507 | Strang | Mar. 18, 1902 |
| 984,659 | Greco | Feb. 21, 1911 |
| 1,912,990 | Mechlovitz et al. | June 6, 1933 |